United States Patent [19]

Thibault

[11] 4,307,158

[45] Dec. 22, 1981

[54] PRESSURE RELIEF APPARATUS FOR SEALED CONTAINERS SUCH AS GALVANIC CELLS

[75] Inventor: William C. Thibault, Gainesville, Fla.

[73] Assignee: General Electric Company, Gainesville, Fla.

[21] Appl. No.: 164,404

[22] Filed: Jun. 30, 1980

[51] Int. Cl.³ .............................................. H01M 2/12
[52] U.S. Cl. ....................................... 429/56; 429/185
[58] Field of Search ................. 429/56, 53, 57, 54, 429/72, 185; 277/29; 220/207, 203

[56] References Cited

U.S. PATENT DOCUMENTS

| | | | |
|---|---|---|---|
| 3,062,910 | 11/1962 | Schenk, Jr. | 429/56 |
| 3,214,300 | 10/1965 | Nordvik | 429/56 |
| 3,262,819 | 7/1966 | Belove | 429/56 |
| 3,279,953 | 10/1966 | Bierdumpfel | 429/56 |
| 3,415,690 | 12/1968 | Richman | 429/56 |
| 3,685,686 | 8/1972 | Raidl | 220/207 |
| 4,073,402 | 2/1978 | Wood | 220/207 |
| 4,207,385 | 6/1980 | Hayama | 429/56 |

*Primary Examiner*—Anthony Skapars
*Attorney, Agent, or Firm*—Pollock, Vande Sande & Priddy

[57] ABSTRACT

An improved pressure relief apparatus is disclosed for use with sealed containers such as those found in many galvanic cells. A specially shaped diaphragm (32, 34, 36, 38, 40) is situated across an opening (14) to the interior of the container (10), beneath a piercing point (48). When the pressure within the container reaches a preselected level, the diaphragm snaps rapidly outwardly into contact with the piercing point, thus causing itself to be pierced and relieving the accumulated pressure.

10 Claims, 1 Drawing Figure

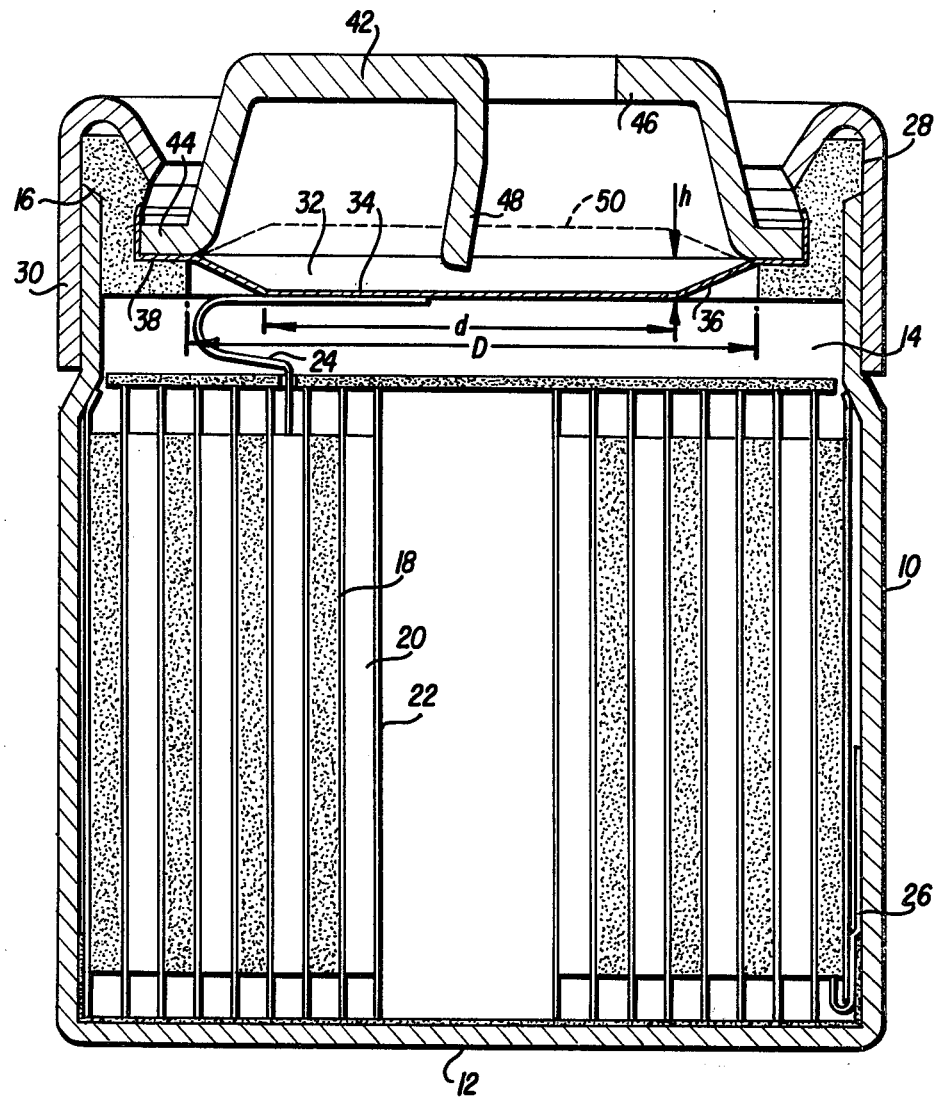

PRESSURE RELIEF APPARATUS FOR SEALED CONTAINERS SUCH AS GALVANIC CELLS

DESCRIPTION

Technical Field

The present invention relates in general to apparatus for relieving overpressure within a container. More particularly, the invention concerns such apparatuses in which a diaphragm is mounted in the wall of the container for a sealed galvanic cell so that one side of it is exposed to the internal gas pressure of the cell and the other side is exposed to a piercing point which pierces the diaphragm when it deflects sufficiently in response to the gas pressure.

Background Art

Various types of sealed galvanic cells are known in which the electrochemistry of the cell is such that gases are evolved. When sealed containers are used for such cells, these gases may develop high pressures which in turn may cause the container to rupture. To combat this problem, pressure relief devices have been developed in which a diaphragm located in the container wall is ruptured or pierced when excessively high pressures are developed. Typically, this has been accomplished by providing a piercing point close to the diaphragm, so that the diaphragm deflects into contact with the point in response to the internal pressure of the cell.

While this type of pressure relief apparatus has achieved a measure of success, reliable performance has been hindered by variations in piercing point sharpness, varying elastic properties of the diaphragm material, partial piercing of the diaphragm during assembly due to the interference fit commonly provided, and failure to provide full pressure relief due to slow piercing action. Thus, a need has continued to exist for an economical, reliable pressure relief apparatus for sealed galvanic cells and similar containers.

DISCLOSURE OF THE INVENTION

A primary object of the invention is to provide an improved, highly reliable pressure relief apparatus for use with sealed galvanic cells.

Another object of the invention is to provide such an apparatus which is economical to manufacture and requires no significant alteration of the design of the galvanic cell.

A further object of the invention is to provide such an apparatus with an improved pressure relief diaphragm which facilitates attachment to a cell electrode.

Still another object of the invention is to provide such an apparatus in which complete release of internal pressure is achieved, yet dependence on piercing point sharpness for pressure release is substantially reduced.

These objects of the invention are given only by way of example; thus, other desirable objectives and advantages inherently achieved by the disclosed structure may occur to those skilled in the art. Nonetheless, the scope of the invention is to be limited only by the appended claims.

In one embodiment of the invention, a normally sealed galvanic cell or similar container is provided with a flexible diaphragm disposed across an opening in the cell container. The diaphragm is configured so that it comprises means for causing itself to snap outward toward its exterior side, in response to internal gas pressure in the container acting on its interior side. Means are provided for piercing the diaphragm as it snaps outward, thereby relieving the overpressure. By "snap outward" is meant that in response to increasing pressure the diaphragm will bulge slowly outwardly until a certain internal pressure is reached, at which point its geometry causes it to move suddenly, rapidly outwardly into contact with the adjacent piercing point, thereby puncturing itself and releasing the pressure.

In the preferred embodiment of the invention, the diaphragm comprises an inwardly depressed central area having a radially extending peripheral flange. As the pressure increases, the depressed central area snaps outward from one side of its peripheral flange to the other. A conical portion of the diaphragm extends between the depressed central area and the flange. The diaphragm is captured between an annular seal ring and a cover button which supports a piercing point. Effective snap action has been achieved when the flange is approximately 1.3 times larger in inner diameter than the diameter of the central area; the height of the conical portion is from 0.056 to 0.089 times the diameter of the central area and from 3 to 5 times the thickness of the diaphragm.

BRIEF DESCRIPTION OF THE DRAWINGS

The FIGURE shows a vertical elevation view, in section, of a sealed galvanic cell embodying the pressure relief apparatus according to the invention.

BEST MODE FOR CARRYING OUT THE INVENTION

The following is a detailed description of a preferred embodiment of the invention, reference being made to the drawing in which numerals are used to identify the various elements of the invention.

A sealed galvanic cell, of conventional design except for the pressure relief apparatus, comprises a cylindrical casing or container 10 having a closed lower end 12 and an open upper end 14 with a peripheral edge 16. Within container 10, opposite polarity electrodes 18, 20 are separated by a porous, electrically insulating sheet 22 and coiled into a generally cylindrical configuration which fits within container 10. An electrode or tab 24 extends upwardly from the positive electrode and a similar tab 26 extends from the negative electrode into contact with container 10. An annular gasket or seal ring 28 contact edge 16 and is held in place by a reinforcing ring 30.

Arranged across the opening into housing 10 defined by the inside diameter of seal ring 28 is a flexible pressure release diaphragm 32 according to the present invention. Diaphragm 32 preferably is made from a thin, circular disk of a resilient material such as low carbon steel and comprises a central depressed area 34 of circular configuration having a diameter d, an integral upwardly and radially outwardly extending annular, conical portion 36 having a height h, an integral radially extending annular peripheral flange 38 lying in a plane above depressed area 34 and having an inner diameter D and an integral axially extending peripheral flange 40. Flanges 38 and 40 are attached to or otherwise bear against seal ring 28, as illustrated.

A dished-out cover button 42 having an integral radially extending base flange 44 rests on top of diaphragm 32, with base flange 44 contacting peripheral flange 38 and seal ring 28. The upper wall 46 of button 42 is deformed near its center to provide a downwardly extending, generally triangular piercing point 48 (when viewed from the side, not illustrated), which terminates a short distance above diaphragm 32. To complete the electrical connection of the cell, tab 24 is welded to the underside of diaphragm 32 which in turn maintains electrical contact with button 42 via flanges 38 and 44. The lower position of depressed area 34 facilitates the welding of tab 24, compared to prior art devices where a flat diaphragm is used.

When a galvanic cell of the type illustrated is operated, gases are evolved which collect in the void spaces within container 10. As the pressure of these gases rises, diaphragm 32 eventually begins to bulge upwardly. As the pressure continues to rise, depressed area 34 comes to an intermediate position beneath piercing point 48. Due to the unique geometry of diaphragm 32, movement beyond such an intermediate position is characterized by a rapid acceleration or "snap" to a new position on the opposite side of the plane of flange 38. That is, central depressed area 34, conical portion 36 and radially extending flange 38 comprise a means for causing the diaphragm to snap outward toward its exterior side in response to internal gas pressure in the container acting on its interior side. If piercing point 48 were not present, diaphragm 32 would snap over to a position essentially like that shown in phantom at 50. However, piercing point 48 prevents completion of this movement by all portions of diaphragm 32, which impales itself on the point and releases the overpressure within container 10.

In one actual embodiment of the invention, diaphragm 32 was made from an aluminum killed, corrosion resistant low carbon steel having a reference thickness of 0.005 inches and a minimum thickness of 0.0035 inches. Diameter d was 0.270 to 0.280 inches; diameter D was 0.360 to 0.370 inches; and height h was 0.015 to 0.125 inches. Piercer point 48 was made from the same material as diaphragm 32 but was approximately 0.020 inches thick, with a 43° to 47° angle between the sides of its essentially triangular tip (not illustrated). The tip of point 48 extended from 0.002 to 0.012 inches below the lower surface of base flange 44, bringing it within 0.003 to 0.023 inches from the upper surface of diaphragm 32. In general, the desired snap action of diaphragm 32 can be obtained with similarly resilient materials when the ratio of diameter D to diameter d is approximately 1.3; and axial height h is from 0.056 to 0.089 times diameter d, as well as from 3 to 5 times the thickness of diaphragm 32. The pressure at which snap over occurs may be adjusted by changing the diaphragm thickness and the diameter and depth of the depressed area.

Industrial Applicability

While the apparatus according to the invention has been illustrated as particularly useful in combination with sealed galvanic cells, those skilled in the art will appreciate that a pressure relief apparatus according to the invention may be used to vent excess pressure from any type of containers.

Having described my invention in sufficient detail to enable others to make and use it, I claim:

1. An improved pressure relief apparatus for use in combination with a normally sealed galvanic cell of the type having a container subject to internal gas pressure, said apparatus comprising:
a flexible diaphragm adapted to be disposed across an opening in said container, said diaphragm comprising means for causing itself to snap outward toward its exterior side in response to internal gas pressure in said container acting on its interior side, said means for causing said diaphragm to snap comprising a circular central area having a diameter, an annular flange surrounding said central area and having an inner diameter larger than said diameter of said central area, said central area being depressed below the plane of said flange toward the interior of said container, and a conical portion in said diaphragm extending between said central area and said annular flange, the axial height of said conical portion being less than said diameter of said central area and greater than the thickness of said diaphragm; and
means adapted to be positioned at the opening for piercing said diaphragm as it snaps outward, thereby relieving the internal gas pressure.

2. Apparatus according to claim 1, wherein said inner diameter of said flange is approximately 1.3 times larger than said diameter of said central area; and the axial height of said conical portion is from 0.056 to 0.089 times said diameter of said central area and from 3 to 5 times the thickness of said diaphragm.

3. Apparatus according to claim 1, wherein said piercing means comprises a cover extending over said diaphragm on the exterior side thereof, said cover comprising a piercing point extending downward therefrom in position to pierce said diaphragm when it snaps outward.

4. Apparatus according to claim 3, further comprising an annular seal adapted to be positioned between said flange and the edge of said opening, and a second flange on said cover, said second flange being positioned in contact with said annular flange.

5. Apparatus according to claim 4, further comprising a flange extending upwardly from said annular flange, said annular seal also being adapted to be positioned between said upwardly extending flange and the edge of said opening.

6. An improved pressure relief apparatus for use in combination with a normally sealed container which is subject to internal gas pressure, said apparatus comprising:
a flexible diaphragm adapted to be disposed across an opening in said container, said diaphragm comprising means for causing itself to snap outward toward its exterior side in response to internal gas pressure in said container acting on its interior side, said means for causing said diaphragm to snap comprising a circular central area having a diameter, an annular flange surrounding said central area and having an inner diameter larger than said diameter of said central area, said central area being depressed below the plane of said flange toward the interior of said container, and a conical portion in said diaphragm extending between said central area and said annular flange, the axial height of said central area and said annular flange, the axial height of said conical portion being less than said diameter of said central area and greater than the thickness of said diaphragm; and
means adapted to be positioned at the opening for piercing said diaphragm as it snaps outward, thereby relieving the internal gas pressure.

7. Apparatus according to claim 6, wherein said piercing means comprises a cover extending over said diaphragm on the exterior side thereof, said cover comprising a piercing point extending downward therefrom in position to pierce said diaphragm when it snaps outward.

8. Apparatus according to claim 7, further comprising an annular seal adapted to be positioned between said flange and the edge of said opening, and a second flange on said cover, said second flange being positioned in contact with said annular flange.

9. Apparatus according to claim 8, further comprising a flange extending upwardly from said annular flange, said annular seal also being adapted to be positioned between said upwardly extending flange and the edge of said opening.

10. Apparatus according to claim 6, wherein said inner diameter of said flange is approximately 1.3 times larger than said diameter of said central area; and the axial height of said conical portion is from 0.056 to 0.089 times said diameter of said central area and from 3 to 5 times the thickness of said diaphragm.

* * * * *